Aug. 27, 1940.  A. B. SPERRY  2,212,799
HARMONIC ANALYZER
Filed Oct. 24, 1938  2 Sheets-Sheet 1
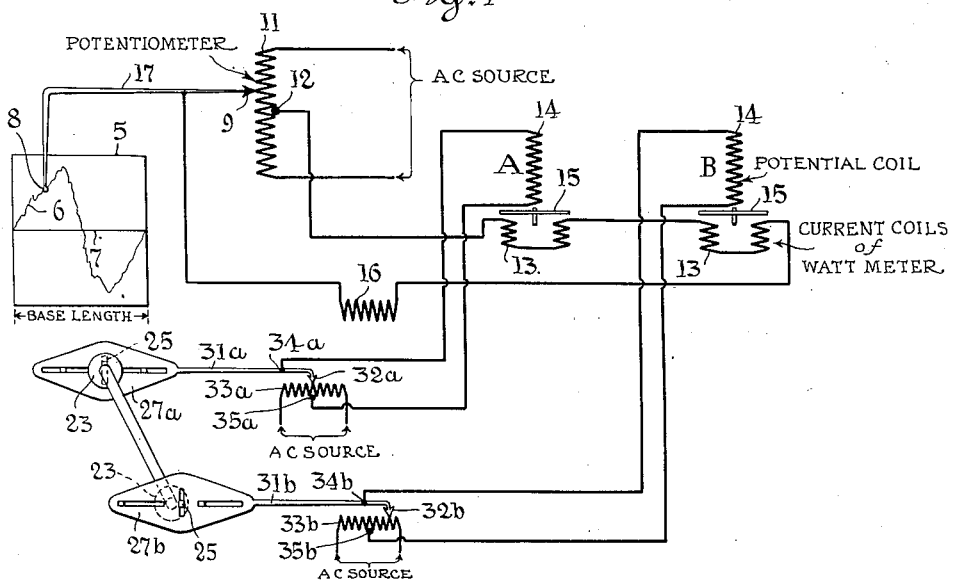
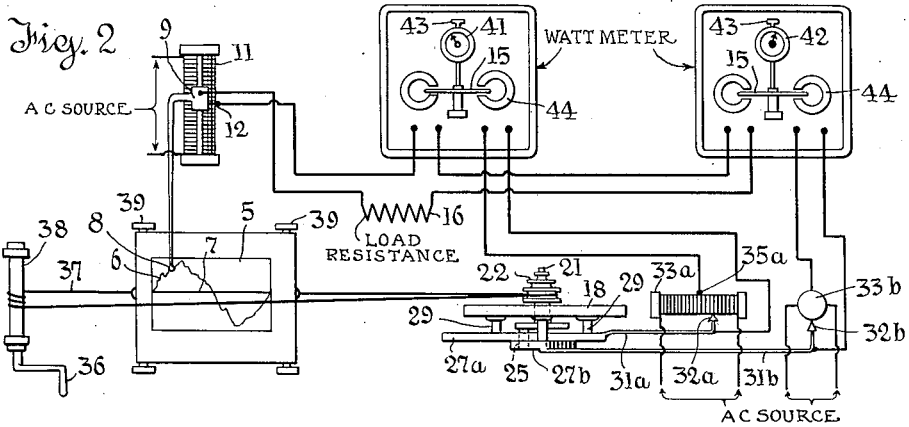
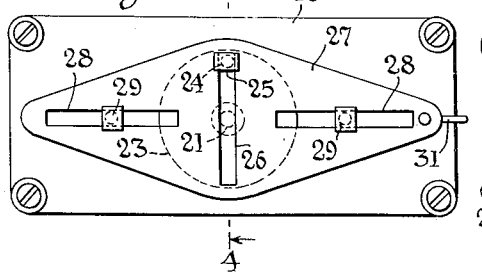
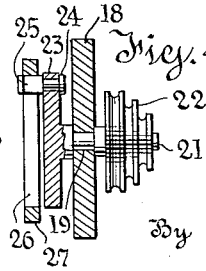
Inventor
Arthur B. Sperry
By Dodge and Ims
Attorneys

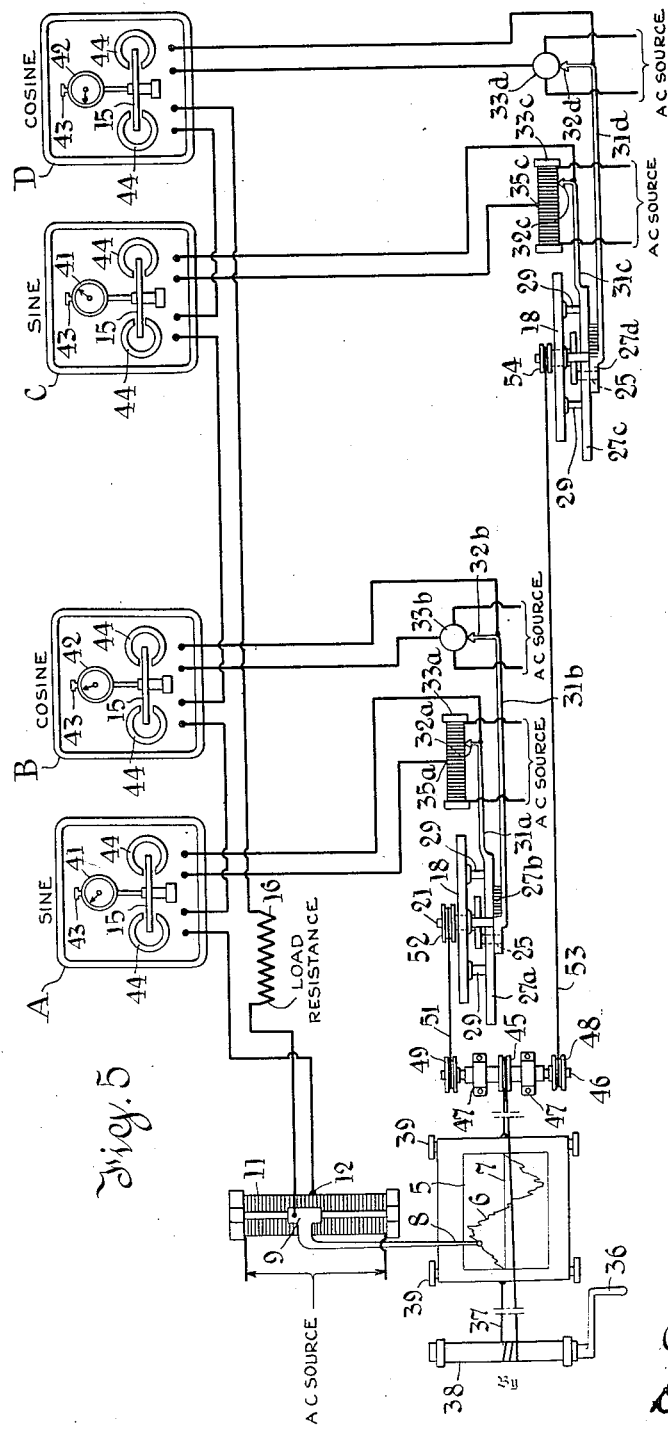

Patented Aug. 27, 1940

2,212,799

UNITED STATES PATENT OFFICE 2,212,799

HARMONIC ANALYZER

Arthur B. Sperry, Clifton, N. J.

Application October 24, 1938, Serial No. 236,821

11 Claims. (Cl. 33—1)

This invention relates to harmonic analysis and more particularly to electrical methods and apparatus for analyzing a complex wave representing a variable function having a substantially recurrent pattern.

One example of a complex wave representing a variable function is vibration which is, by definition, a physical motion which repeats itself in all particulars after an interval of time called the period. Fourier's series is the most convenient mathematical method of expressing such a non-harmonic periodic motion, since by it any complex repeating function may be exactly determined, by using a sufficient number of terms in the Fourier series. Because all of the components in any periodic function are harmonic, and, further, because all forcing functions may be considered as quasi-harmonic in nature, an harmonic analysis of a complex wave leads to an identification of the forcing function, both as to frequency and amplitude.

Consequently harmonic analysis and synthesis become useful in the investigation of vibration and related problems where the problem can be presented in the form of a curve or record corresponding to a mathematical series such as that of Fourier having the form $$y = a_1 \sin \theta + a_2 \sin 2\theta \ldots + a_n \sin n\theta + b_0 + b_1 \cos \theta + b_2 \cos 2\theta \ldots + b_n \cos n\theta$$

In this equation $y$ is the variable, $a_n$ and $b_n$ are undetermined constant coefficients, and $\theta$ is an angle which varies linearly from zero to 360° from beginning to end of the given function. The variable $y$ can be determined from the above equation if the values of the constant terms $a_n$ and $b_n$ can be found.

The present invention is primarily directed to a method of and apparatus for determining these constants quickly and accurately, and by the use of apparatus which is far less costly than that used heretofore for a similar purpose. It is an electrical method in which a record or curve to be analyzed is traced or scanned, and in which there are produced currents proportional to the ordinates of the curve at successive points thereon, and electromotive forces proportional to the sine and cosine of integral multiples of the angle of the curve at each of said points. The instantaneous values of currents and electromotive forces are then integrated by means of an integrating watt meter comprising a slightly modified watt hour meter having a special type of resettable register thereon. Such a method lends itself to use of well developed apparatus and provides a quick accurate method of analysis which avoids mathematical computation and overcomes substantially all of the difficulties of prior art apparatus. It thus becomes available for commercial application where numerous tests are made, and where speed is of the essence so far as it is consistent with practical accuracy.

In normal use a watt-hour meter gives the time integral of the product of volts and amperes. In the present case the current applied to the current coils of the meter is made proportional to the ordinates of the curve to be analyzed at successive points thereon, and the record is caused to move in the direction of the abscissa at a constant velocity, while at the same time sinusoidally varying electromotive forces are applied to the voltage coil of the meter. The meter disk will, therefore, turn a number of times which is proportional to the time integral of the product, and will indicate a value comprising a constant multiplied by the required harmonic coefficient. When this constant has once been determined for the particular instrument, the registers may be calibrated to give a direct reading of the desired coefficients or, more readily, the value of the circuit constants may be adjusted to make the registers indicate any desired value.

The main object of the present invention is, therefore, to provide simple accurate mechanism for the direct and rapid determination of Fourier series coefficients. Another object is to provide a method which can be adapted to commercial use, making use of certain standard forms of apparatus which are readily available without special design.

While methods embodying the present invention may be carried out in various ways, one typical apparatus will be illustrated and described in detail, it being understood that the applications are not confined to vibration curves alone, but are of general scope, of which vibration is one example only.

In the drawings:

Figure 1 is a diagram showing one typical form of circuit which may be used for carrying out the method of the present invention;

Fig. 2 is a diagrammatic view of one form of apparatus suitable for harmonic analysis according to the present invention, and indicating the parts necessary for determining a single harmonic with both its sine and cosine constituents;

Fig. 3 is a face view of one component of one form of apparatus, namely a Scotch yoke device for changing rotary motion into simple harmonic motion;

Fig. 4 is a section on line 4—4 of Fig. 3; and

Fig. 5 is a diagrammatic view similar to Fig. 2, but showing an arrangement suitable for determining simultaneously the presence of a plurality of harmonics.

Referring to Fig. 1 of the drawings, reference character 5 designates a record or curve sheet, or a film carrying a curve 6 having a base length as indicated and subject to analysis for the purpose of determining what harmonics it contains. The line 7 indicates the base line or axis of abscissas.

As indicated above, the present method requires a tracing or scanning of the curve 6. This step in the method may be carried out manually or by photoelectric scanning methods. The curve could, of course, be in the form of a sound track on the variable density principle and employing the usual pick-up such as is used in sound film moving picture apparatus. While the material upon which the record is carried may vary, it will, in practice, in commercial analysis probably be most usual to produce this record on a 35 m. m. moving picture film. In order to simplify the illustration here, it has been indicated that the tracing device consists of a stylus 8 capable of being manually traversed over the curve 6, and concurrently moving a contact 9 over a potentiometer upon the input terminals of which there is impressed an electric current from a suitable source of alternating current. The purpose of this potentiometer is, as indicated above, to produce a current which has its instantaneous root mean square value varied in accordance with the ordinates of the curve 6 as the stylus 8 traverses the curve.

As shown, the output current is determined by the distance of the movable contact 9 from the center connection 12 of the potentiometer 11, and this output current is impressed upon the current coils of two integrating watt meters A and B. In accordance with the usual practice, these watt meters include current coils 13, potential or voltage coils 14, and a rotatable induction disk shown diagrammatically and designated 15. The manner of connecting the current coils to the output of the potentiometer 11 is not important so long as the currents taken off the potentiometer are proportional to the ordinates of the curve under analysis, and that the variations which take place in the coils of one meter should be properly related to those which take place in another meter in the same device. As shown in Fig. 1, the two sets of current coils are in series with each other and with a load resistance 16, one output terminal being at mid-point 12 of the potentiometer resistance, and the other being connected to the contact arm 17 which carries the stylus 8 and the contact 9.

It will be apparent that when the record chart 5 is moved in a direction parallel to the base line 7 at constant speed, and the stylus 8 is caused to trace the curve 6, the current impressed upon the current coil terminals between the points 9 and 12 will have an instantaneous root mean square value which is proportional to the ordinates of the curve 6, and that this current will be impressed upon the current coils of watt meters A and B. This will determine one factor to be used by the integrating watt meters in determining the coefficients with which the present invention is concerned. The load resistance controls the amount of current flowing in the current coil circuit for any given potentiometer setting, hence it determines the calibration of the instrument.

In practicing the invention, it is necessary that some means be provided for translating rotary motion into simple harmonic motion in order to produce sinusoidally varying electromotive forces to be impressed upon the potential coils 14 of the watt meters A and B. The use of Scotch yoke devices for this purpose in harmonic analyzers is known, consequently a brief description of the device shown in detail in Figs. 3 and 4 will be sufficient for an understanding of the present invention.

In Fig. 4, reference character 18 designates a suitable support having a bearing 19 therein and supporting a rotatable shaft 21 carrying a stepped pulley 22. The opposite end of the shaft carries a disk 23 in which is mounted an eccentric 24 terminating at its left hand end in a block 25 which is movable in a vertical slot 26 in a yoke 27. The yoke 27 also contains two horizontal guide slots 28 which cooperate with fixed blocks 29 carried by the base plate 18, and cause the translation of the yoke 27 to take place in a fixed plane and arm 31 to execute simple harmonic motion. Consequently, each time that pulley 22 makes a complete revolution, the block 25 travels twice the length of the slot 26, that is, it moves from the top of the slot as indicated in Fig. 3 to the far end of the slot back to the position shown. During this same period the movement of the yoke 27 will be such that the blocks 29 make a complete traverse of the slots 28. In Fig. 3, for example, 27 will move so that block 29 reaches one end of the slot 28, returns to its mid-position, reaches the other end of the slot 28, and again returns to its mid-position. The effect of this movement is to cause the arm 31 to execute simple harmonic motion and to permit coordination of this motion with the rotary motion of the pulley 22.

In Fig. 1 of the drawings the parts of the Scotch yoke device are indicated diagrammatically, those cooperating with the meters A and B being identified by subscripts $a$ and $b$, respectively. It will be seen that if the mechanism which causes traverse of the curve chart 5 also imparts rotary motion to the stepped pulley 22, the arm 31$a$ will move contact 32$a$ over potentiometer 33$a$ so that contact 32$a$ will execute simple harmonic motion and impress an electromotive force varying sinusoidally upon the potential coil 14 of meter A, the output terminals of the potentiometer 33$a$ being indicated 34$a$ and 35$a$ respectively, while the input terminals are supplied with current from any suitable source of alternating current.

The same mechanism which moves the yoke 27$a$ also moves concurrently the yoke 27$b$, as shown in Fig. 1, to impress a sinusoidally varying electromotive force upon the potential coil of watt meter B, for example, the block 25 may extend through the slots 26 of both yokes 27$a$ and 27$b$ (Fig. 2). The yokes 27$a$ and 27$b$ are similar except that they are so disposed as to be 90° apart in phase, and in this way one of the watt meters indicates the sine coefficient and the other the cosine coefficient.

In Fig. 2, there has been illustrated a simple mechanism embodying the circuits of Fig. 1, and wherein the curve chart 5 is moved by means of a crank 36 to wind a cord 37 on a rotatable drum 38. The curve chart 5 carried on rotatable supports 39 is thus caused to move relatively to the stylus 8 which is guided over the curve to move the potentiometer contact 9 as previously described. The cord 37 also passes around the pulley 22 which drives simultaneously the movable contact arms of the two Scotch yoke devices, one associated with potentiometer 33a and the other with the potentiometer 33b. The connections shown correspond to those already indicated in Fig. 1, but here the watt meter disks 15 are shown connected to registers 41 and 42, the register 41 indicating the sine function and the register 42 indicating the cosine function. The registers 41 and 42 are provided with suitable resetting mechanism such as buttons 43, so that they can be set back to zero after each operation, thus making it unnecessary to perform calculations to determine their readings. In utilizing a standard type of watt meter for the purposes of this invention, it is necessary to remove the shading coil for light load compensation, because the meter must be capable of operation either forward or backward in response to exactly similar conditions, and since the ordinary problem of light load compensation is not present. The usual eddy current drag magnets 44 are employed.

The operation of the mechanism shown in Fig. 2 for the purpose of determining the coefficients $a_n$ and $b_n$ would be carried out as follows: The registers 41 and 42 are set to zero, and the crank 36 moved to bring the stylus 8 in coincidence with the starting point of the curve 6 on the base line 7. The crank 36 is then turned to move the chart 5 with respect to the stylus 8 while the stylus is caused to follow the trace of curve 6 exactly. This impresses currents upon the current coils of the two watt meters, these currents being proportional to the ordinates of the curve 6. At the same time, the yokes 27a and 27b are caused to move their contact arms across the potentiometers 33a and 33b respectively. In this way, sinusoidally varying electromotive forces are impressed upon the potential coils 14 of the meters A and B, both electromotive forces being proportional to the distance the stylus 8 has travelled from its starting point, but the two electromotive forces differing in phase by 90°. When the stylus has traversed the base length of the curve 6, the parts are stopped in the exact position which they occupy at the end of their traverse, and the readings of the registers 41 and 42 taken. Register 41 will indicate a value proportional to the integrated value of the instantaneous currents and electromotive forces impressed upon the coils of meter A during the traverse of the stylus over the curve 6. The register 42 will indicate a value proportional to the same product that is indicated by register 41, but the two values differing between themselves due to the 90° phase displacement of the two potentiometer contacts 32a and 32b. The constants are known from previous calibrations so that the coefficients $a_n$ and $b_n$ may be determined directly from the reading of the registers 41 and 42, $n$ being the particular harmonic sought. Zero reading of the registers will, of course, indicate the absence of the particular harmonic under test.

The apparatus shown is capable of determining a single harmonic only and is intended to indicate the principle only. It is possible, however, by the use of additional sets of watt meters to determine the presence or absence of any number of harmonics by a single trace of the curve 6 if two watt meters are provided for each harmonic sought. If, for example, 10 harmonics are to be investigated, 20 watt meters will be needed with suitable connections to impress upon the current coils of those watt meters, currents which are proportional to the ordinates of the curve under analysis, and upon the potential coils sinusoidally varying electromotive forces, with the electromotive forces varying in accordance with the angles of the curve at the points where the current values are investigated.

In the mechanism shown the drive pulley 22 is shown stepped so that the Scotch yoke devices may be driven at different speeds to determine three different harmonics, although only one harmonic can be determined at one time. Obviously the apparatus can be adapted to determination of any number of harmonics. If several harmonics are to be determined simultaneously by the use of several sets of watt meters, there will be a Scotch yoke device for each meter and all of the yokes will be driven simultaneously but all at different speeds, the speed of each corresponding to the frequency of the particular harmonic sought, and all in fixed phase relation to one another and to the movement of the curve being investigated.

A form of apparatus suitable for testing for two harmonics is shown in Fig. 5. Obviously, the principle is applicable to the determination of any number of harmonics, as indicated above.

Referring to Fig. 5, the parts in general correspond to those illustrated in Fig. 2, with the addition, however, of watt meters C and D for integrating the sine and cosine functions, respectively, of the additional harmonic sought. Watt meters A and B are the same as in Fig. 2.

The record tracing means, together with the watt meters A and B and the Scotch yoke devices 27a and 27b, have already been described in connection with Fig. 2, and function as before. The voltage coils of the additional watt meters C and D are supplied with sinusoidal electromotive forces by apparatus similar to that which supplies the watt meters A and B, but these devices are driven at a different speed from that of the yokes 27a and 27b. Inasmuch as the currents impressed upon all the watt meters are the same, the current coils of watt meters C and D are placed in series with those of A and B, and include the load adjusting resistance 16, as before, receiving current from the potentiometer 11 associated with the stylus 8 which is used to trace the record under analysis.

Although in practice, as pointed out above, it is necessary that the devices for producing sinusoidal electromotive forces be driven positively, the present illustration has been made to depict the invention without complicating the mechanism, and for that reason the Scotch yoke devices are shown to be driven by pulleys and belts. In Fig. 5, the cord 37 is wound about the drum 38, as before, and causes the record chart to be progressed at a suitable rate. The cord 37 passes around a pulley 45 carried by a shaft 46 mounted in suitable bearings 47. A pulley 49 at one end of the shaft is connected by cord 51 with a pulley 52 carried on the shaft of the Scotch yoke devices 27a and 27b, and causes them to operate in the manner described in connection with Fig. 2. The additional Scotch yoke devices, designated 27c and 27d, in order to correlate them with meters C and D, are driven from pulley 48 by cord 53 and a pulley 54 carried on the actuating shaft of the devices. It will be observed that the size of driven pulley 54 differs from that of pulley 52 because the additional set of meters C and D is for the purpose of determining a higher harmonic than that of A and B, and hence the Scotch yoke devices 27ᶜ and 27ᵈ must be driven at a higher speed.

The potentiometers and voltage connections with the coils of meters C and D are arranged as in Fig. 2 and bear the same reference characters for corresponding parts, with the use, however, of subscripts "c" and "d" in place of the subscripts "a" and "b" of Fig. 2.

It will be apparent that the operation of the mechanism shown in Fig. 5 is similar to that described in connection with Fig. 2, except that the four Scotch yoke devices will be driven simultaneously, so that meters A and B will register a value indicative of the presence or absence of the harmonic sought (a register indicates 0 if the harmonic is absent), while the registers C and D indicate the presence or absence of a higher harmonic. Thus, by a single traverse wherein stylus 8 is caused to pass over the curve 6 and the Scotch yoke devices are driven, the presence or absence of two harmonics will be determined and their values indicated, as discussed above.

Inasmuch as the extension of the principle to the determination of a greater number of harmonics is indicated by the differences between Figs. 2 and 5, it is believed that the metes and bounds of the invention will be understood without further illustration or description.

It is to be understood that in the practice of this invention various refined mechanisms may be utilized for carrying out the steps of analysis, and while a cord and pulley drive is shown, this is merely for illustration as a positive drive is essential to the accuracy of the device. Consequently, the illustrations made are intended only to illustrate the basic principles of the invention and without any intention of limiting it to the specific illustrations given.

While numerous types of harmonic analyzers have been suggested in the prior art, so far as I am aware they have embodied complicated mechanical set-ups more or less prohibitive in cost, and too complex and fragile for commercial use. The present invention is capable of being embodied in apparatus of comparatively simple construction, rugged in character and capable of use by relatively inexperienced personnel. Consequently, it lends itself to commercial use for the carrying out of numerous analyses almost instantaneously, and permitting use of these analyses in fields heretofore thought prohibitive. Consequently, while harmonic analyzers are old and well known, the present invention is believed to be the first embodiment in which the factors have been determined as herein set forth and the integrated values necessary to determining the harmonic coefficients of a Fourier series obtained by the use of an integrating watt meter or equivalent mechanism. It is not desired, therefore, that the scope of the present invention be limited to precise details shown, since these are given as illustrations only.

What is claimed is:

1. An electric harmonic analyzer comprising means for scanning a curve to be analyzed; a source of electric current; means for continuously varying said current to make it instantaneously proportional to the ordinates of said curve at successive points thereon; means for continuously controlling the electromotive force of said source to render it instantaneously proportional to sinusoidal functions of said curve at each of said points; and a single means for continuously obtaining the products of said instantaneous values of current and electromotive force and integrating said products over the curve section under analysis.

2. An electric harmonic analyzer for a record representing a variable function and having a substantially recurrent pattern, comprising a source of electric current; means for continuously scanning said record and varying said current proportionally to changes in amplitude of said record as said scanning takes place; means for producing sinusoidally varying electromotive forces from said source in fixed phase relation to the operation of said scanning means; and means for continuously obtaining the products of the instantaneous values of said currents and electromotive forces and integrating them over the section of the record under analysis.

3. An electric harmonic analyzer for a record representing a variable function and having a substantially recurrent pattern, comprising a source of electric current; means for continuously scanning said record and varying said current proportionally to changes in amplitude of said record as said scanning takes place; means for producing sinusoidally varying electromotive forces from said source in fixed phase relation to the operation of said scanning means; means for continuously obtaining the products of the instantaneous values of said currents and electromotive forces; and means comprising an integrating watt meter for integrating said products over the section of the record under analysis.

4. An electric harmonic analyzer comprising means for scanning a curve to be analyzed; a source of electric current; means for continuously varying said current to make it instantaneously proportional to the ordinates of said curve at successive points thereon; means comprising a Scotch yoke device for continuously controlling the electromotive force of said source to render it instantaneously proportional to sinusoidal functions of said curve at each of said points; and a single means comprising an integrating watt meter for continuously obtaining the products of said instantaneous values of current and electromotive force, and integrating said products over the curve section under analysis.

5. A device for harmonic analysis of a record representing a variable function and having a substantially recurrent pattern, comprising a potentiometer having a source of current connected to its input terminals; means for scanning said record and continuously varying the current output from said potentiometer proportionally to changes in amplitude of said record as said scanning takes place; second and third potentiometers having electromotive forces applied to their input terminals; means for harmonically varying the electromotive force outputs from said second and third potentiometers in fixed phase relation to each other and to the operation of said scanning means, one of said electromotive forces representing a sine function, and the other a cosine function; and means comprising an integrating watt meter for integrating the products of the instantaneous values of currents and electromotive forces over the record section under analysis.

6. Apparatus for the harmonic analysis of a record of a variable function having a substantially recurrent pattern, which comprises means for obtaining electric currents which are instantaneously proportional to the amplitude of said record at successive points thereon; means for obtaining electromotive forces which are instantaneously proportional to a simple harmonic function of said record at each of said points;

and means for integrating the products of the instantaneous values of said currents and electromotive forces at each of said points over the record section under analysis.

7. Apparatus for the electric harmonic analysis of a curve representing a variable function having a substantially recurrent pattern, comprising means for tracing said curve; means for obtaining electric currents which are instantaneously proportional to the ordinates of said curve at successive points thereon; means for obtaining electromotive forces instantaneously proportional to sinusoidal functions of said curve at each of said points; and means for integrating over the curve section under analysis the products of the instantaneous values of said currents and electromotive forces at each of said points.

8. Apparatus for analyzing a mathematical curve to determine its harmonic constituents, comprising a source of electric current; means for varying said current to give values instantaneously proportional to the ordinates of said curve at successive points thereon; means for supplying an electromotive force to give values respectively instantaneously proportional to the sine and cosine functions of said curve at each of said points; means for obtaining the separate products of the instantaneous values of said currents and said electromotive forces at each of said points; and means for integrating said products over the curve section under analysis.

9. Apparatus for the harmonic analysis of a record having a substantially recurrent pattern and representing a variable function, comprising means for scanning said record; a source of electric current; means operating concurrently with said scanning means for varying said electric current according to said record to produce a current which varies with the ordinates at successive points on said record and means for supplying electromotive forces varying respectively with sinusoidal functions of the curve at said successive points; and means for separately integrating the products of the instantaneous values of said currents and electromotive forces at said points between the limits of the pattern under analysis.

10. Apparatus for the harmonic analysis of a record having a substantially recurrent pattern and representing a variable function, comprising means for scanning said record; a source of electric current; a plurality of electric integrating devices; means operating concurrently with said scanning means for varying said electric current according to said record and impressing upon said integrating devices a current which varies with the ordinates at successive points on said record; and a plurality of means each operating at a speed determined by the frequency of the particular harmonic sought for impressing upon said devices electromotive forces varying respectively with sinusoidal functions of the curve at said successive points.

11. Apparatus for the harmonic analysis of a record having a substantially recurrent pattern and representing a variable function, comprising means for scanning said record; a source of electric current; a plurality of electric watt meters; means operating concurrently with said scanning means for varying said electric current according to said record and impressing upon said watt meters a current which varies with the ordinates of said record at successive points thereon; and a plurality of means each operating at a speed determined by the frequency of the harmonic sought for impressing upon said watt meters electromotive forces which are respectively instantaneously proportional to the sine and cosine functions of said curve at each of said points and cooperate with said current to cause said watt meters to integrate respectively the products of the instantaneous values of said currents and electromotive forces over the record under analysis.

ARTHUR B. SPERRY.